June 8, 1965  H. T. M. RICE  3,187,871
CENTRIFUGAL CLUTCH
Filed May 26, 1961
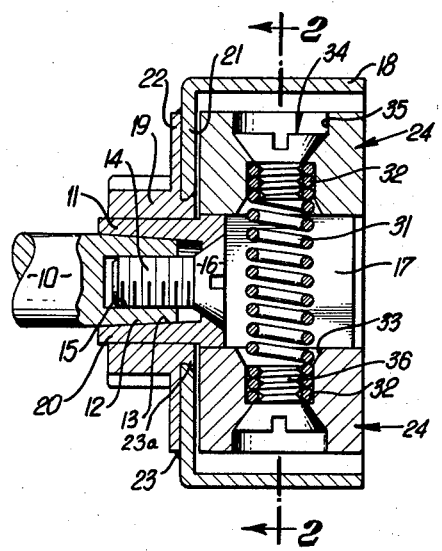
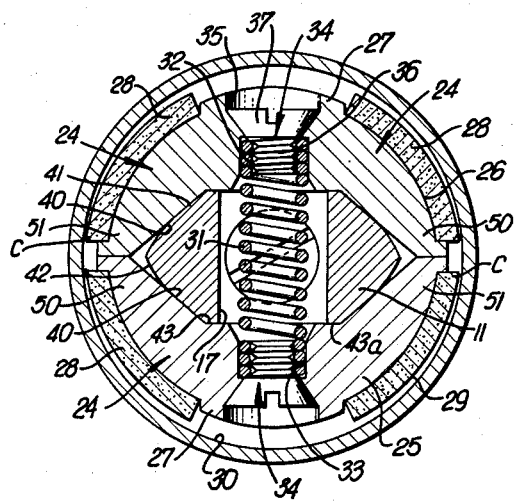
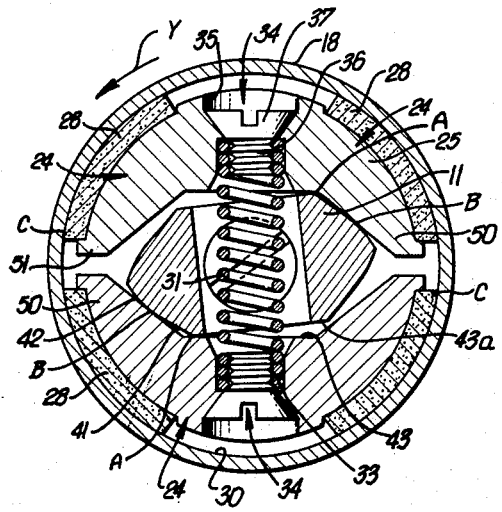
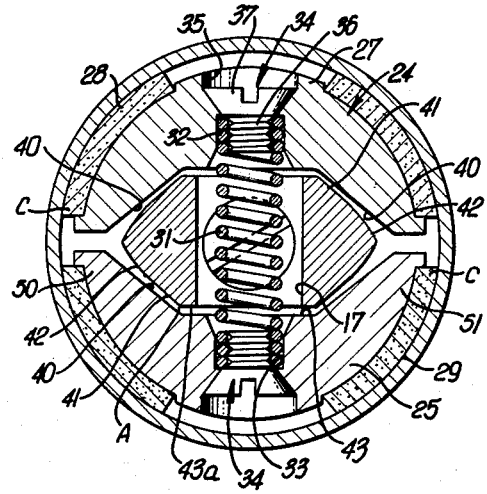
INVENTOR.
HENRY T. M. RICE
BY
ATTORNEY.

3,187,871
CENTRIFUGAL CLUTCH
Henry T. M. Rice, San Gabriel, Calif., assignor to Ohlsson & Rice, Inc., Los Angeles, Calif., a corporation of California
Filed May 26, 1961, Ser. No. 113,015
14 Claims. (Cl. 192—105)

The present invention relates to clutches, and more particularly to clutches of the centrifugally actuated type.

An object of the invention is to provide a centrifugal clutch that engages smoothly and uniformly when a predetermined speed of the driving member is reached. The clutch also releases readily when the speed drops below a predetermined value, and regardless of the load on the clutch.

Another object of the invention is to provide a centrifugal clutch having a large load carrying capacity for its size and a long, useful life, and which is economical to manufacture.

A further object of the invention is to provide a centrifugal clutch of the friction type that provides a positive drive when engaged and when subjected to loads, but which will not remain in a locked condition when the speed drops below a predetermined value despite being subjected to heavy loads, under which conditions the clutch fully releases.

An additional object of the invention is to provide a centrifugal clutch embodying friction shoes, in which the clutching force is transmitted substantially uniformly over the entire area of the clutching face of each shoe, resulting in uniform wear over the clutching faces and long life of the clutch parts. Since force transmission at localized areas of each shoe is avoided, abnormal friction heating does not occur at concentrated regions, which would shorten the useful life of the clutch.

Another object of the invention is to provide a centrifugal clutch embodying shoes which are readily releasable from clutching engagement with a companion driven member, and which are centered and held centered and free from contact with the driven member when unclutched therefrom.

Yet a further object of the invention is to provide a centrifugal clutch embodying shoes which are readily released from clutching engagement by a spring device when the speed of the clutch decreases to a desired value, the spring device being capable of exerting a substantial retracting force on the shoes, and yet occupies a comparatively small space.

Still another object of the invention is to provide a centrifugal clutch embodying shoes which are urged to a released condition by a spring device which exerts substantially the same spring force on the shoes when in their engaged condition, as when they are in their disengaged or released condition. The spring force does not change to any material degree as a result of wear of the clutching faces of the shoes.

A further object of the invention is to provide a centrifugal clutch embodying a spring for retracting the clutch shoes from clutching engagement with a companion driven member, in which the spring is secured firmly to the shoes in a novel manner.

Another object of the invention is to provide a centrifugal clutch embodying spring retractable friction shoes having clutch lining extending across the full width of each shoe and backed up completely by the body of the shoes, so as to provide a larger clutching area and greater load transmitting capacity, as well as longer life of the parts.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a longitudinal section through a centrifugal clutch embodying the invention, parts being shown in side elevation;

FIG. 2 is a cross-section taken along the line 2—2, illustrating the clutch in its released condition;

FIG. 3 is a view similar to FIG. 2, illustrating the clutch in its clutching or driving condition;

FIG. 4 is a view similar to FIG. 2, illustrating the clutch on the point of being automatically released.

The clutch illustrated in the drawings can releasably connect a driving member with a driven member. A drive shaft 10 is secured to a driving cam member 11 in any suitable manner, as by wedging a tapered end portion 12 of the shaft in a companion tapered bore 13 in the driving member 11, the parts being held together, so that they rotate as a unit, by a screw 14 threaded in a socket 15 in the end portion of the shaft and with its head 16 engaging the drive member 11. The screw may be inserted through a slot 17 extending across the drive member.

A driven member or drum 18 surrounds the slotted drive cam member 11, being suitably secured to a driven gear 19 rotatable on an extending hub portion 20 of the drive member. The drum 18 may be attached to the gear 19, as by forcing an end plate portion 21 of the drum against a companion plate portion 22 of the gear and holding them together by peening over part 23a of the driven member 19 against an inner portion of the drum plate 21. In lieu of the mode of attachment specifically described, the parts 21, 22 may be attached together by use of brazing or soldering material 23.

The drive member 11 is adapted to be releasably coupled to the driven member or drum 18 by speed responsive or centrifugally actuated elements. As shown, a pair of opposed clutch shoes 24 are disposed on opposite sides of the drive cam members, the body of each shoe being of substantial arcuate extent. As shown by way of example in the drawings, each shoe may have an arcuate extent of about 165°. The body 25 of each shoe has peripheral recesses 26 on opposite sides of its central portion 27, in which are received clutch linings 28 attached to the shoe body in any suitable manner, as by cementing them thereto. A lining 28 may extend across the full width of the shoe body 25 and is solidly backed by the latter. Its periphery 29 preferably has a radius of curvature equal to the radius of the inner surface 30 of the driven drum 18, having the same center at the inner surface 30 of the drum when engaged therewith.

The shoes 24 are normally urged toward a retracted position, free from engagement with the drum 18, by a helical tension spring 31 extending freely through the drive member slot 17, which has its end portions 32 secured to the shoes 24. As disclosed, each end portion 32 is disposed within an inner bore or socket 33 in the shoe body 25, which has an internal diameter closely approximating the external diameter of the end portion 32 of the spring. A retainer or lock screw 34 is disposed in an outer bore 35 in the outer central portion 27 of the shoe and has a threaded shank 36 threadedly received within the end turns 32 of the spring. The head 37 of the screw may be countersunk and held within a companion countersunk bore portion 35 of the shoe.

Because of the reception of the end turns 32 of the spring within the thread shank grooves 36, and the close proximity of the periphery of the end turns to the wall of the bore or socket 33, the spring 31 cannot pull out of such bore or socket 33 and is held firmly therewithin. The opposed screws 34 are threaded into the end portions 32 of the spring 31 to place the spring under the desired amount of tension when the shoes 24 are in their retracted position.

The inner portions of the shoes 24 are disposed around the drive cam member 11 so that the latter, upon rotating, will also rotate the shoes. When the shoes are rotated at a sufficient speed to overcome the force of the tension spring 31, they will move outwardly and place their linings 28 in frictional contact with the driven drum 18, rotating the latter and the driven gear 19 attached thereto. When the speed of the driving member 11 and shoes 24 drops below a certain value, the intervening tension spring 31 will pull the shoes inwardly automatically from contact with the driven drum, effecting an unclutching action therefrom.

It is to be noted that each shoe 24 has tapered inner walls 40 converging toward each other in an outward transverse direction, and disposed on opposite sides of companion cam surfaces 41, 42 on the drive member 11. As disclosed, the internal tapered surfaces 40 on each clutch shoe body intersect a transverse surface 43 substantially at right angles to the axis of the helical spring 31, when the clutch shoes 24 are in their retracted position. Each cam surface on the driving member 11 may be straight along a portion 41 of its length, conforming to the straight tapered surface 40 on the shoe or body 25, and convexly curved along an adjacent portion 42 of its length. Because of the fact that the tapered cam surfaces 41 on the drive member 11 converge toward each other in a transverse outward direction, and conform to the tapers 40 on each shoe 24, each shoe is centered on the drive member 11 when the spring 31 pulls it back into the retracted position illustrated in FIG. 2, in which position the clutch linings 28 are free from engagement with the inner surface 30 of the driven member 18. When in a retracted position, the surface 43 on each shoe may engage a companion surface 43a on the driving member 11.

As the drive shaft 10 and drive member 11 rotate (as in the direction of the arrow Y in FIG. 3), the opposed clutch shoes 24 are rotated with it, the shoes retaining their central position illustrated in FIG. 2, until the speed of the rotating parts reaches a sufficient value overcoming the tension of the spring 31, being forced out by centrifugal force into engagement with the driven drum 18, which may be assumed to be rotating at a speed substantially less than that of the driving member 11, or, which may even have an initially stationary state. As the clutch shoes 24 engage the drum 18, there is resistance to their rotation offered by the latter. As a result, the drive member 11 will turn arcuately to some extent relative to the shoes 24, the opposed cam surface 42 on the drive member forcing the trailing portions 50 of the shoes outwardly against the drum, in order to increase the frictional force of the shoe linings 28 against the inner drum surface. The greater the resistance offered by the drum 18, the greater will be the camming action of the cam surfaces 42 against the trailing portions 50 of the shoes, to urge them outwardly against the drum 18, so that the latter will be caused to rotate.

The cam surfaces 42 engage the trailing portions 50 of the shoe, which actually are of wedge shape from their inner tapered surface 40 to the periphery 29 of the trailing clutch lining 28. When each shoe 24 engages the drum 18, the resistance to rotation offered by the latter shifts the shoe angularly in a rearward direction with respect to the drive member 11, causing the shoe 24, in effect, to be wedged between the drive cam 11 and the periphery 30 of the drum. The rear portion 50 of each shoe is forced against the drum 18 at a mechanical advantage. In addition, the outward force of the leading portion 51 of each shoe against the drum is also comparatively great, due to the large angle at which the leading end C of the shoe is pressed against the inner surface 30 of the drum. Such a large angle is due to the fact that the leading end C of the shoe is displaced from the point of engagement B of the drive member 11 with the rear portion 50 of the shoe by a considerable arcuate extent (FIG. 3). The angle at which the drive member 11 is tending to force the leading end C of the shoe against the drum is the angle that a line drawn through the points B and C makes with a tangent to the drum surface 30 drawn through the point C. Such a large angle also has a large mechanical advantage associated with it, so that the force exerted between the drive member 11 and the rear portion 50 of the shoe is multiplied in pressing the leading portion 50 of the shoe out against the drum, as at the point C. In fact, the force urging the leading portion 51 or lining of the shoe outwardly into engagement with the drum 18 substantially equals the outward force of the cam 42 against the trailing portion 50 or lining of the shoe against the drum. Because of the mechanical advantages of the force transmitted between the drive member 11 and each shoe 24, a large force is available for clutching the shoe to the drum 18, the latter being caused to rotate with the shoes and being held frictionally coupled thereto in a positive manner, so long as the speed of rotation of the shoes 24 remains above the disengaging or retracting force exerted by the spring 31 thereon.

In the event that a heavy load is encountered, which reduces the speed of the clutch below a certain value, the shoes 24 will be released from the drum 18 regardless of the fact that a heavy load is being transmitted. In other words, the clutch does not lock up and remain locked until the driving member 11 stalls. Assuming a heavy load is imposed upon the driven member 18, causing its deceleration, each shoe 24, being relatively massive, tends to continue moving in a forward direction (arrow Y), causing its trailing portion 50 to unwedge from between the drive member 11 and the driven member 18. With the speed of the clutch reduced to a sufficient extent by the application of the heavy load, the spring 31 is then effective to pull the shoes 24 inwardly from clutching engagement with the drum 18. Such inward pulling is actually multiplied by the fact that a trailing portion 50 of each shoe will engage the point of intersection A between the cam surface 41 on the drive member 11 and its transverse surface 43a, which will then act as a fulcrum point, the line of action of the spring 31 being disposed to one side of such fulcrum point A, and thereby exerting a moment arm on the shoe 24 to insure its inward movement out of engagement with the driven drum 18. In other words, the spring force is assisted by the moment arm of its line of action from the fulcrum point A in unwedging the trailing portion 50 of the shoe from the drive member 11 and drum 18, and in moving the shoe to its retracted position. The multiplication of the spring force, due to its lever arm from the point A, overcomes the mechanical advantage of the cam 11 acting upon the shoe 24 and tending to hold the leading portion 51 of the shoe frictionally engaged with the drum. As a result, the spring 31 pulls both shoes 24 inwardly toward the retracted position, and because of the co-engagement of the tapered inner surfaces 40 on each shoe with the companion tapered surfaces 41 on the drive member 11, the shoe will be centered and nested against the drive member 11 with its linings 28 free from engagement with the drum 18. The shoes center automatically to their retracted position when the speed of clutch drops below a predetermined value corresponding to the force of the tension spring 31.

The use of only two opposed clutch shoes 24, each of which has a large arcuate extent, allows an intervening spring 31 to be used for action on both of the shoes simultaneously, which exerts an equal resisting force on each of the shoes, tending to prevent its outward movement, and also tending to move each shoe inwardly from its outward position. The free coils of the spring 31 do not engage any other member, so that there is no interference with proper action of such coils by any other member. The use of the spring between the shoes themselves, and extending freely through the drive member 11, allows a relatively long spring to be employed. Because of its comparatively large length, the spring does not increase in length or decrease in length to any great relative extent, when the clutch shoes 24 move into engagement with the drum or out of engagement from the drum. As a result, the force exerted by the spring 31 remains substantially constant, or the same, when the shoes 24 are in their drum engaging position, as well as when they have been disengaged and moved to their fully retracted position. Even when the lining 28 wears, the spring tension does not increase to any large extent, as a result of the shoes moving outwardly into engagement with the drum.

The simplicity of the arrangement and the mode of securing the spring 31 to the shoes allows a required spring to be selected to secure engagement of the clutch shoes with the drum at any desired speed. In fact, a spring can be selected having a comparatively large resisting force, and still be embodied in a clutch of relatively small size. Moreover, the spring arrangement does not interfere with the shoe linings 28, which, as stated above, can extend across the full width of each shoe and be backed solidly by the shoe body 25 across the entire width of the lining. As a result, a large area of lining is available for bearing against the inner surface 30 of the drum, the outward force being exerted substantially uniformly over the entire area of the lining, eliminating localized pressure points that would tend to cause concentrated heating of the lining and produce its failure, thereby shortening the useful life of the clutch.

It is, accordingly, apparent that a centrifugal clutch has been provided which is capable of providing a positive friction drive between the driving and driven members, the clutch shoes being engaged with the drum over a large surface, and being capable of transmitting comparatively large loads. Despite the loads imposed on the clutch, which might be relatively heavy, assurance is had that the clutch will release when its speed drops below a predetermined value, so that there is no danger of the clutch locking up and the drive member 11 stalling. The clutch shoes are shifted automatically to their retracted position when the speed drops below its predetermined value, and the retraction is assisted by the fact that the spring force is multiplied by the lever arm over which it is acting from the fulcrum points A on the drive member. The spring 31 can have a large tension, if desired, and its action is free from interference with any other parts. Moreover, a simple manner of securing the spring to the shoe is provided that does not interfere with the clutch lining itself. The spring force remains substantially the same when the shoes are in their retracted position, as well as when they are in their clutch engaging position. The clutch has a large load carrying capacity for its size, it engages smoothly and uniformly, and releases readily when the speed drops below a predetermined value.

I claim:

1. In a clutch: a driving member; a driven member having an internal surface; opposed clutch shoes having outer clutch surfaces conforming to the curvature of said internal surface and movable outwardly by centrifugal force into engagement with said driven member surface; said driving member having surfaces for each shoe converging toward each other in an outward transverse direction and engageable with companion converging surfaces on said shoe; said driving member converging surfaces engaging companion surfaces on said shoes to drivably engage the outer surfaces of said shoes with said driven member internal surface; and spring means secured to said shoes and passing through said driving member in the plane of engagement of said driving member with said shoes normal to the axis of said driving member for resisting centrifugal force acting on said shoes and for shifting said shoes inwardly to engage said converging shoe surfaces with companion driving member surfaces and center said shoes on said driving member out of engagement with said driven member.

2. In a clutch: a driving member having a transverse opening therethrough; a driven member having an internal surface; opposed clutch shoes having outer clutch surfaces conforming to the curvature of said internal surface and movable outwardly by centrifugal force into engagement with said driven member surface; said driving member having surfaces for each shoe converging toward each other in an outward transverse direction and engageable with companion converging surfaces on said shoe; said driving member converging surfaces engaging companion surfaces on said shoes to drivably engage the outer surfaces of said shoes with said driven member internal surface; and tension spring means secured to said shoes and passing through said opening in the plane of engagement of said driving member with said shoes normal to the axis of said driving member for resisting centrifugal force acting on said shoes and for shifting said shoes inwardly to engage said converging shoe surfaces with companion driving member surfaces to center said shoes on said driving member out of engagement with said driven member.

3. In a clutch: a driving member; a driven member having an internal surface; opposed clutch shoes movable outwardly by centrifugal force into engagement with said driven member; each shoe having a central portion, a leading portion, and a trailing portion, said leading and trailing portions having outer surfaces conforming to said internal surface; said driving member having cam means engageable with said trailing portions to force the outer surfaces of said trailing portions outwardly against said driven member surface and the outer surfaces of said leading portions against said driven member surface; and spring means extending diametrically of said driving member and secured to said central portions of said shoes for resisting centrifugal force acting thereon and for shifting said shoes inwardly from engagement with said driven member surface.

4. In a clutch: a driving member having a transverse opening therethrough; a driven member having an internal surface; opposed clutch shoes movable outwardly by centrifugal force into engagement with said driven member; each shoe having a central portion, a leading portion, and a trailing portion, said leading and trailing portions having outer surfaces conforming to said internal surface; said driving member having cam means engageable with said trailing portions to force the outer surfaces of said trailing portions outwardly against said driven member surface and the outer surfaces of said leading portions against said driven member surface; and a tension spring secured to said central portions and passing through said opening in the plane of engagement of said driving member with said shoes normal to the axis of said driving member for resisting centrifugal force acting thereon and for shifting said shoes inwardly from engagement with said driven member surface.

5. In a clutch: a driving member having a transverse opening therethrough; a driven member having an internal surface; opposed clutch shoes movable outwardly by centrifugal force into engagement with said driven member; each shoe having a central portion, a leading portion, and a trailing portion, said leading and trailing portions having outer surfaces conforming to said internal surfaces; said driving member having surfaces for each shoe converging toward each other in an outward direction and engageable with companion converging surfaces on said leading and trailing portions of each of said shoes; said trailing converging surfaces on said driving member engaging companion surfaces on the trailing portions of said shoes to force the outer surfaces of said trailing portions outwardly against said driven member internal surface and the outer surfaces of said leading portions against said driven member internal surface; and a tension spring secured to said central portions and passing through said opening in the plane of engagement of said driving member with said shoes normal to the axis of said driving member for resisting centrifugal force acting on said shoes and for shifting said shoes inwardly to engage said converging shoe surfaces with companion driving member surfaces and center said shoes on said driving member out of engagement with said driven member surface.

6. In a clutch: a driving member; a driven member having an internal surface; a clutch shoe movable outwardly by centrifugal force into engagement with said driven member; said shoe having a central portion, a leading portion, and a trailing portion, said leading and trailing portions having outer surfaces conforming to said internal surface; said driving member having cam means engageable with said trailing portion to force the outer surface of said trailing portion outwardly against said driven member surface and the outer surface of said leading portion against said driven member surface; and a tension spring extending generally radially of said driving member in the plane of engagement of said driving member with said shoe normal to the axis of said driving member and secured to said central portion for resisting centrifugal force acting on said shoe and for shifting said shoe inwardly from engagement with said driven member surface.

7. In a clutch: a driving member; a driven member having an internal surface; a clutch shoe having an outer clutch surface conforming to the curvature of said internal surface and movable outwardly by centrifugal force into engagement with said driven member surface and engaged by said driving member to be urged against said driven member surface; said driving member having fulcrum means fixed thereto; and yieldable means secured to said shoe in the plane of engagement of said driving member with said shoe normal to the axis of said driving member for resisting centrifugal force acting thereon and for rocking said shoe about said fulcrum means inwardly from engagement with said driven member surface.

8. In a clutch: a driving member; a driven member having an internal surface; opposed clutch shoes movable outwardly by centrifugal force into engagement with said driven member, each shoe having a central portion, a leading portion, and a trailing portion, said leading and trailing portions having outer surfaces conforming to said internal surface; said driving member having cam means engageable with said trailing portions to force the outer surfaces of said trailing portions outwardly against said driven member surface and the outer surfaces of said leading portions against said driven member surface; said driving member having fulcrum means fixed thereto; and spring means extending diametrically of said driving member and secured to said central portions of said shoes in the plane of engagement of said driving member with said shoes normal to the axis of said driving member for resisting centrifugal force acting on said shoes and for rocking said shoes about said fulcrum means inwardly from engagement with said driven member surface.

9. In a clutch: a driving member having a transverse opening therethrough; a driven member having an internal surface; opposed clutch shoes movable outwardly by centrifugal force into engagement with said driven member; each shoe having a central portion, a leading portion, and a trailing portion, said leading and trailing portions having outer surfaces conforming to said internal surface; said driving member having cam means engageable with said trailing portions to force the outer surfaces of said trailing portions outwardly against said driven member surface and the outer surface of said leading portion against said driven member surface; said driving member having fulcrum means fixed thereto; and a tension spring secured to said central portions and passing through said opening in the plane of engagement of said driving member with said shoes normal to the axis of said driving member for resisting centrifugal force acting on said shoes and for rocking said shoes about said fulcrum means inwardly from engagement with said driven surface member.

10. In a clutch: a driving member having a transverse opening therethrough; a driven member having an internal surface; opposed clutch shoes movable outwardly by centrifugal force into engagement with said driven member; each shoe having a central portion, a leading portion, and a trailing portion, said leading and trailing portions having outer surfaces conforming to said internal surface; said driving member having surfaces for each shoe converging toward each other in an outward transverse direction and engageable with companion surfaces on said shoe; trailing converging surfaces of said driving member constituting cam means engageable with said companion surfaces of trailing portions of said shoes to force the external surfaces of said trailing portions outwardly against the driven member internal surface and the external surfaces of said leading portions against said driven member internal surface; said driving member having fulcrum means thereon; and a tension spring secured to said central portions and passing through said opening for resisting centrifugal force acting on said shoes and for rocking said shoes about said fulcrum means inwardly from engagement with said driven member internal surface.

11. In a clutch: a driving member having a transverse opening therethrough; a driven member; opposed clutch shoes movable outwardly by centrifugal force into engagement with said driven member and engaged by said driving member to be urged against said driven member; a helical tension spring passing through said opening; and a screw at each end of said spring and engaging each shoe and threadedly engaging the turns of said spring for securing said spring to said shoe.

12. In a clutch: a driving member; a driven member; a clutch shoe movable outwardly by centrifugal force into engagement with said driven member and engaged by said driving member to be urged against said driven member; a helical tension spring; and a screw engaging said shoe and threadedly engaging the turns of said spring for securing said spring to said shoe, whereby said spring resists centrifugal force acting on said shoe and shifts said shoe inwardly from engagement with said driven member.

13. In a clutch: a driving member; a driven member having an internal surface; a clutch shoe movable outwardly by centrifugal force into engagement with said driven member surface; said shoe having a central portion, a leading portion, and a trailing portion, said leading and trailing portions having outer surfaces conforming to said internal surface; said driving member having cam means engageable with said trailing portion to force the outer surface of said trailing portion outwardly against said driven member surface and the outer surface of said leading portion against said driven member surface; a helical tension spring adjacent to said central portion of said shoe; and a screw engaging said central portion and threadedly engaging the turns of said spring for securing said spring to said shoe, whereby said spring resists centrifugal force acting on said shoe and can shift said shoe inwardly from engagement with said driven member surface.

14. In a clutch: a driving member; a driven member having an internal surface; a clutch shoe movable outwardly by centrifugal force into engagement with said driven member; said shoe having a central portion, a leading portion, and a trailing portion, said leading and trailing portions having outer surfaces conforming to said internal surface; said driving member having cam means engageable with said trailing portion to force the outer surface of said trailing portion outwardly against said driven member surface and the outer surface of said leading portion against said driven member surface; said central portion having a bore therein; a helical tension spring having an end portion in said bore closely confined therein; and a screw engaging said central portion and threaded within the turns of said spring disposed in said bore for securing said spring to said shoe, whereby said tension spring resists centrifugal force acting on said shoe and shifts the external surfaces of said shoe inwardly from engagement with said driven member surface.

References Cited by the Examiner

UNITED STATES PATENTS

| | | |
|---|---|---|
| 1,032,524 | 7/12 | Wiard. |
| 2,214,602 | 9/40 | Arnold. |
| 2,243,565 | 5/41 | Kimball et al. |

FOREIGN PATENTS

| | | |
|---|---|---|
| 467,719 | 8/50 | Canada. |
| 1,067,243 | 1/54 | France. |
| 1,105,581 | 7/55 | France. |
| 1,261,589 | 4/61 | France. |
| 531,322 | 8/31 | Germany. |
| 130,393 | 8/19 | Great Britain. |
| 245,323 | 1/26 | Great Britain. |
| 604,576 | 7/48 | Great Britain. |
| 756,020 | 8/56 | Great Britain. |

DAVID J. WILLIAMOWSKY, *Primary Examiner.*

THOMAS J. HICKEY, *Examiner.*